(12) United States Patent
Mitsuno et al.

(10) Patent No.: US 6,590,021 B2
(45) Date of Patent: Jul. 8, 2003

(54) POLYOLEFIN RESIN COMPOSITION AND FILM COMPRISING THE SAME

(75) Inventors: Tadahiro Mitsuno, Ichihara (JP); Hiroyuki Shiraishi, Mutiara Crest (SG)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/962,144

(22) Filed: Sep. 26, 2001

(65) Prior Publication Data
US 2002/0065351 A1 May 30, 2002

(30) Foreign Application Priority Data

Sep. 29, 2000 (JP) ........................................ 2000-299329
Sep. 29, 2000 (JP) ........................................ 2000-299330

(51) Int. Cl.[7] .............................. C08J 3/00; C08K 3/34; C08L 57/02

(52) U.S. Cl. ........................................ 524/447; 524/499

(58) Field of Search .................................. 524/447, 499

(56) References Cited

FOREIGN PATENT DOCUMENTS

| JP | 7-258478 | 10/1995 |
|----|----------|---------|
| JP | 8-92428  | 4/1996  |

*Primary Examiner*—Patrick D. Niland
(74) *Attorney, Agent, or Firm*—Sughrue Mion, PLLC

(57) ABSTRACT

There is provided a polyolefin resin composition comprising:

(i) a polyolefin resin, and
(ii) an anti-blocking agent in an amount of from 500 to 15,000 ppm by weight based on the weight of the polyolefin resin, which anti-blocking agent is made of a natural mineral and has specific particle diameters.

14 Claims, No Drawings

POLYOLEFIN RESIN COMPOSITION AND FILM COMPRISING THE SAME

FIELD OF THE INVENTION

The present invention relates to a polyolefin resin composition and a film comprising the same, which film is superior in transparency, a see through property, anti-blocking property, sliding property, anti-scratching property, fabrication and visual appearance (flickering of films), and which film is well-balanced in these properties.

BACKGROUND OF THE INVENTION

With respect to materials used for producing a film for wrapping use, it is required that (1) film formation property is good, and (2) a film-forming machine is hardly stained.

Further, with respect to the film, it is required that (1) an article wrapped is clearly visible (namely, the film is superior in its transparency), (2) its appearance is superior, (3) when a bag is formed from the film, the film is easily handled (namely, the film is superior in its fabrication), (4) when an article is packed in the bag (particularly when it is automatically packed), a mouth of the bag is easy to open (namely, the film is superior in its anti-blocking property and in its sliding property), and (5) when the film or the bag in which an article is packed is transported, any scratch is hardly produced by friction between the films or the bags (namely, the film is superior in its anti-scratching property).

Polyolefin resins such as ethylene-α-olefin copolymers, which are suitably used as materials for producing a film for wrapping use, are used in combination with an additive such as an anti-blocking agent and a lublicant, thereby obtaining a film superior in its anti-blocking and sliding properties.

For example, JP-A 7-258478 discloses a polyolefin resin composition comprising (1) a polyolefin resin, (2) an anti-blocking agent of a substantially sphere form having an average particle diameter of from 1 to 10 µm, and (3) an additional anti-blocking agent, (a) which additional anti-blocking agent is obtained by pulverizing and calcining a natural mineral, (b) which has an average particle diameter of from 1 to 5 µm, and (c) which comprises from 10 to 40% by weight of particles having a particle diameter of not less than 1.5 times said average particle diameter.

Further, JP-A 8-92428 discloses a polyolefin resin composition comprising (1) 100 parts by weight of a polyolefin resin, and (2) 0.01 to 2.0 parts by weight of an anti-blocking agent, which anti-blocking agent has a particle diameter distribution showing not less than two maximum values, among which maximum values a difference between a maximum particle diameter and a minimum particle diameter is not less than 3.0 µm.

However, a film comprising the resin composition disclosed in JP-A 7-258478 has a problem that a see through property and flickering of films are remarkable because said resin composition has a bulky anti-blocking agent of not less than 1.0% by weight, which bulky anti-blocking agent has a particle diameter of not less than 22 µm in a volume particle diameter distribution.

Also, a film comprising the resin composition disclosed in JP-A8-92428 similarly has a problem that a see through property and flickering of films are not satisfactory because said resin composition has a bulky anti-blocking agent of not less than 1.0% by weight, which bulky anti-blocking agent has a particle diameter of not less than 22 µm in a volume particle diameter distribution.

SUMMARY OF THE INVENTION

An object of the present invention is to provide a film, which film is superior in transparency, see through property, anti-blocking property, sliding property, anti-scratching property and fabrication, which film hardly has visually dazzling sense (namely, superior in appearance), and which film is well-balanced in these properties.

Another object of the present invention is to provide a polyolefin resin composition suitable for producing said film.

The present invention provides a polyolefin resin composition comprising:
  (i) a polyolefin resin, and
  (ii) an anti-blocking agent in an amount of from 500 to 15,000 ppm by weight based on the weight of the polyolefin resin, which anti-blocking agent is made of a natural mineral and has:
    (a) a volume average particle diameter of from 1 to 5 µm.
    (b) particles having a particle diameter of not less than 1.5 times the above-defined volume average particle diameter in an amount of from 30 to 40% by weight, and
    (c) particles having a particle diameter exceeding 22 µm in an amount of less than 1.0% by weight,
provided that the above-defined % by weight is based on that the total weight of the anti-blocking agent made of a natural mineral is regarded as 100% by weight.

The present invention also provides a film comprising the above-defined polyolefin resin composition.

DETAILED DESCRIPTION OF THE INVENTION

The "polyolefin resin" used in the present invention means a thermoplastic resin comprising at least one kind of a $C_2$ to $C_{10}$ olefin polymerization unit (said "olefin polymerization unit" is hereinafter referred to simply as "olefin unit"), in an amount of from 50 to 100% by weight (a weight of the polyolefin resin is assigned to be 100% by weight).

Examples of the polyolefin resin are ethylene homopolymers; α-olefin homopolymers; ethylene-α-olefin copolymers; propylene-α-olefin copolymers; ethylene-propylene-α-olefin copolymers; copolymers of ethylene and poly-unsaturated compounds; and copolymers of ethylene, α-olefins and poly-unsaturated compounds.

Examples of the above-mentioned α-olefin are propylene, butene-1, pentene-1, 4-methyl-1-pentene, hexene-1, octene-1 and decene-1. Of these, preferred are propylene, butene-1, hexene-1 and octene-1, and more preferred are butene-1 and hexene-1.

Examples of the poly-unsaturated compounds are divinylbenzene, norbornadiene, dicyclopentadiene, 1,5-hexadiene, 1,7-octadiene, 1,9-decadiene, vinylnorbornene, vinylcyclohexene and ethylidenenorbornene. Of these, preferred are divinylbenzene, norbornadiene and dicyclopentadiene.

Besides ethylene homopolymers, the above-mentioned α-olefin homopolymers contains, for example, propylene homopolymers, butene-1 homopolymers and 4-methylpentene-1 homopolymers. Of these, preferred are ethylene homopolymers and propylene homopolymers.

Examples of the above-mentioned ethylene-α-olefin copolymers are ethylene-propylene copolymers, ethylene-butene-1 copolymers, ethylene-4-methylpentene-1 copolymers, ethylene-hexene-1 copolymers, ethyleneoctene-1 copolymers and ethylene-decene-1 copolymers. Of these, preferred are ethylene-butene-1 copolymers, ethylene-4-methylpentene-1 copolymers, ethylene-hexene-1 copolymers, ethylene-octene-1 copolymers and ethylene-butene-1 copolymers.

Examples of the above-mentioned propylene-α-olefin copolymers are propylene-4-methylpentene-1 copolymers and propylene-butene-1 copolymers. Of these, preferred is a propylene-butene-1 copolymer.

Examples of the above-mentioned ethylene-propylene-α-olefin copolymers are ethylene-propylene-butene-1 copolymers and ethylene-propylene-hexene-1 copolymers. Of these, preferred is an ethylene-propylene-butene-1 copolymer.

Examples of the above-mentioned ethylene-α-olefin-poly-unsaturated compound copolymers are ethylene-propylene-divinylbenzene copolymers, ethylene-propylene-norbornadiene copolymers and ethylene-propylene-dicyclopentadiene copolymers. Of these, preferred is an ethylene-propylene-divinylbenzene copolymers.

A preferred polyolefin resin is the ethylene-α-olefin copolymer. A content of an α-olefin unit in the copolymer is preferably from 0.5 to 30% by weight, and more preferably from 1.0 to 20% by weight, based on 100% by weight of the sum of an ethylene unit content and an a-olefin unit content. A density (d) of the copolymer is preferably from 880 to 970 kg/m$^3$, more preferably from 890 to 940 kg/m$^3$, and much more preferably from 910 to 930 kg/M$^3$. A melt flow rate (MFR) of the copolymer is preferably from 0.1 to 50 g/10 min., more preferably from 0.2 to 20 g/10 min., and much more preferably from 0.3 to 5.0 g/10 min. A cold xylene-soluble portion (CXS) of the copolymer is preferably that (t by weight) satisfying the following formula (1).

$$CXS \leq 1.5 \times 10^{-4} \times (d/1000)^{-125} \times MFR^{0.5} + 0.3 \qquad (1)$$

The polyolefin resin may comprise a polymerization unit other than the polymerization unit of the monomers mentioned above. Examples of such a polymerization unit are polymerization units of unsaturated carboxylic acids such as acrylic acid, methacrylic acid and maleic acid; polymerization units of esters of said unsaturated carboxylic acids; polymerization units of acid anhydrides such as maleic anhydride; and polymerization units of vinyl esters such as vinyl acetate. Examples of the polyolefin resin comprising such a polymerization unit are ethylene-acrylic acid copolymers, ethylene-methacrylic acid copolymers, ethylene-maleic acid copolymers, ethylene-vinyl acetate copolymers, propylene-acrylic acid copolymers, propylene-methacrylic acid copolymers, propylene-maleic acid copolymers and propylene-vinyl acetate copolymers.

A process for producing the polyolefin resin is not limited, and may be a production process known in the art. Examples of the production process are an anionic polymerization process and a coordination polymerization process, both of which use a polymerization catalyst such as a Ziegla Natta catalyst, a metallocene catalyst and a vanadium catalyst; and a radical polymerization process using a polymerization catalyst such as a peroxide compound. A polymerization manner is not also limited, and may be a known manner such as a bulk polymerization method, a solution polymerization method, a slurry polymerization method, a high pressure polymerization method and a gas phase polymerization method. Of these, preferred are a bulk polymerization method, a solution polymerization method, a high pressure polymerization method and a gas phase polymerization method.

The anti-blocking agent made of a natural mineral (hereinafter referred to as "natural anti-blocking agent"), which is used in the present invention, can be obtained by a process comprising steps of (i) pulverizing a natural mineral and (ii) calcining the obtained pulverized product. If necessary, the process may additionally comprise steps of classifying and collecting the particles. Examples of the natural mineral are silicon dioxide, clay, talc, diatomaceous earth, feldspar, zeolite, kaolinite, wollastonite and sericite. Of these, preferred is kaolinite having a hexagonal plate form or an asymmetric hexagonal plate form.

A pulverizing method in the above-mentioned pulverizing step is not limited. For example, a method using a pulverization means such as a ball mill, a tube mill and a hammer mill is given. The pulverization may be carried out in a dry manner or a wet manner.

A calcining temperature in the above-mentioned baking step is from 200 to 800° C. From a viewpoint of prohibiting a foaming phenomenon at the time of film formation and a blackening phenomenon of film end surfaces, it is preferably from 500 to 800° C. In this step, constitution water contained in crystals of the pulverized product can be removed.

A volume average particle diameter of the natural anti-blocking agent is from 1 to 5 $\mu$m, and preferably from 2 to 5 $\mu$m. When the volume average particle diameter is less than 1 $\mu$m, anti-blocking property of the film in accordance with the present invention may be inferior. Whereas, when it exceeds 5 $\mu$m, transparency of the film may be inferior.

In the volume particle diameter distribution of the natural anti-blocking agent, a content (b1) of particles having a particle diameter of not less than 1.5 times the above-defined volume average particle diameter is from 30 to 40% by weight, and preferably from 33 to 40% by weight. When the content is less than 30% by weight, fabrication of the film may be inferior, and when it exceeds 40% by weight, transparency of the film may be inferior.

In the volume particle diameter distribution of the natural anti-blocking agent, a content (b2) of particles having a particle diameter exceeding 22 $\mu$m is less than 1.0% by weight, and preferably less than 0.5% by weight. When the content is not less than 1.0% by weight, flickering of films may be remarkable.

A content of the natural anti-blocking agent in the polyolefin resin composition in accordance with the present invention is from 500 to 15,000 ppm, and preferably from 1,000 to 10,000 ppm by weight based on the weight of the polyolefin resin. When the content is less than 500 ppm by weight, anti-blocking property of the film may be insufficient. When it exceeds 15,000 ppm by weight, transparency and see through property of the film may be deteriorated.

From a viewpoint of obtaining a polyolefin resin composition having satisfactory anti-blocking property, it is recommended to use the polyolefin resin or the natural anti-blocking agent in combination with a synthetic anti-blocking agent of a spherical form having a volume average particle diameter of from 1 to 10$\mu$m, and preferably from 2 to 7 $\mu$m. When the volume average particle diameter of the synthetic anti-blocking agent is less than 1 $\mu$m, anti-blocking property of the film may not be satisfactory, and when it exceeds 10 $\mu$m, transparency of the film may be inferior. When the synthetic anti-blocking agent is not spherical, a sense of transparency of the film may be inferior.

The above-mentioned "spherical form" means that a coefficient (S) of circular degree calculated by the following formula (2) is preferably from 0.600 to 1.00, more preferably from 0.630 to 1.00, and much more preferably from 0.700 to 1.00. When the coefficient of circular degree comes closer to 1, the shape of the synthetic anti-blocking agent comes closer to a complete sphere. In the formula (2), "A" and "L" are an area of a subject and a perimeter thereof, respectively, wherein the subject is that in an image obtained by subjecting a photograph of the synthetic anti-blocking agent taken by an optical microscope to treatment with an image analyzer.

$$S=4\pi \times A/L^2 \qquad (2)$$

Examples of the synthetic anti-blocking agent are inorganic synthetic anti-blocking agents and organic synthetic anti-blocking agents. Specific examples of the inorganic anti-blocking agents are silicon dioxide, crystalline aluminosilicates and noncrystal aluminosilicates. Of these, preferred is noncrystal aluminosilicates. The surface of these aluminosilicates may be treated with a surface treating agent such as higher fatty acids containing stearic acid, titanium coupling agents and silane coupling agents. Specific examples of the organic anti-blocking agents are cross-linked acrylic resins such as cross-linked polymethyl methacrylate resins; cross-linked polystyrenic resins; cross-linked silicone resins; and polyamide resins. Of these, preferred are cross-linked polymethyl methacrylate resins. These synthetic anti-blocking agents may be used singly or in a mixture of two or more.

The synthetic anti-blocking agents may be those commercially available. Examples of the commercially available inorganic synthetic anti-blocking agents are SILTON JC-30, SILTON JC-40, SILTON JC-50 and SILTON JC-70, which are trade marks of and manufactured by Mizusawa Industrial Chemicals, Co., Ltd., and SYLOSPHERE, which is a trade mark of and manufactured by Fuji Sylisia. Examples of the commercially available organic synthetic anti-blocking agents are MATUMOTO MICROSPHERE M-201, which is a trade mark of and manufactured by Matsumoto Yushi-Seiyaku Co., Ltd., JURIMERE MB-SX, which is a trade mark of and manufactured by Nippon Junyaku Co., Ltd., and EPOSTAR MA1006, which is a trade mark of and manufactured by Nippon Shokubai Co., Ltd.

A weight ratio of the synthetic anti-blocking agent to the natural anti-blocking agent (synthetic anti-blocking agent/natural anti-blocking agent) is from 10/90 to 90/10, and preferably from 30/70 to 70/30. When the ratio is less than 10/90, transparency and see through property of the film may be inferior. When the ratio exceeds 90/10, sliding property and fabrication thereof may be inferior.

A total content of the synthetic anti-blocking agent and the natural anti-blocking agent is from 500 to 15,000 ppm by weight, and preferably from 1,000 to 10,000 ppm by weight, based on the weight of the polyolefin resin. When the content is less than 500 ppm by weight, anti-blocking property of the film may be inferior, and when it exceeds 15,000 ppm by weight, transparency and see through property of the film may be deteriorated.

From a viewpoint of obtaining a polyolefin resin composition having satisfactory anti-blocking property and satisfactory sliding property, it is recommended to use the polyolefin resin or the natural anti-blocking agent in combination with an organic amide compound. From a viewpoint of sliding property, anti-scratching property and anti-blocking property of the film, a content of the organic amide compound in the polyolefin resin composition is preferably from 200 to 5,000 ppm by weight, and more preferably from 500 to 3,000 ppm by weight, based on the weight of the polyolefin resin.

Examples of the organic amide compound are saturated fatty acid amides, unsaturated fatty acid amides, saturated fatty acid bisamides and unsaturated fatty acid bisamides. These may be used singly or in a mixture of two or more.

Specific examples of the above-mentioned saturated fatty acid amides are palmitic acid amide, stearic acid amide and behenic acid amide.

Specific examples of the above-mentioned unsaturated fatty acid amides are oleic acid amide and erucic acid amide.

Specific examples of the above-mentioned saturated fatty acid bisamides are ethylene-bis-palmitic acid amide, ethylene-bis-stearic acid amide and hexamethylene-bis-stearic acid amide.

Specific examples of the above-mentioned unsaturated fatty acid bisamides are ethylene-bis-oleic acid amide, hexamethylene-bis-oleic acid amide and N,N'-dioleyl-sebacic acid amide.

Of these, preferred are stearic acid amide, oleic acid amide, erucic acid amide, ethylene-bis-stearic acid amide and ethylene-bis-oleic acid amide. These may be used singly or in a mixture of two or more.

A process for producing the polyolefin resin composition in accordance with the present invention is not limited. For example, the resin composition can be obtained by uniformly mixing the polyolefin resin and the natural anti-blocking agent and, if necessary, other components such as the synthetic anti-blocking agent and the organic amide compound.

In the above, how to mix them is not limited. There are exemplified a method of dry-blending using a mixing machine such as a tumble mixer and a Henschel mixer; a method of melt-kneading the mixture obtained by the dry-blending, using a kneading machine such as a single screw extruder and a multi screw extruder; and a method of melt-kneading using a kneading machine such as a Banbury mixer, a kneader and a roll mill. It is allowable to mix all components at the same time, or to pre-mix a part of any component and then mix the pre-mixed product and the remainder.

The polyolefin resin and the natural anti-blocking agent may be used in combination with conventional additives such as weathering stabilizers, antioxidants, neutralizing agents, anti-fogging agents, mold lubricants, pigments, flame retarders, inorganic fillers and organic fillers.

The film in accordance with the present invention can be obtained according to a conventional process such as an air cooling tubular film process, a water cooling tubular film process and a casting process.

A thickness of the film is usually from 5 to 200 μm. The film can be used as it is as a single layer film. Alternatively, the film may be used as any layer constituting a multi-layered film, which has the present film layer(s) and different layer(s). In the multi-layered film, it is recommended to dispose the present film layer in at least one outermost layer of the multi-layered film.

Examples of polymers constituting the above-mentioned different layer(s) in the multi-layered film are polyethylene, polypropylene, ethylene-vinyl acetate copolymers, polyamides, polyesters and a mixture thereof.

The multi-layered film can be obtained, for example, by extruding the polyolefin resin composition in accordance with the present invention together with the polymer(s) constituting the different layer(s) according to a co-extrusion tubular film process or a co-extrusion casting process.

The film in accordance with the present invention may be used to produce a lamination-molded product, which comprises the present film and a substrate comprising materials such as plastic films, aluminum foil, hardboards and paper. The lamination-molded product can be obtained, for example, by subjecting (i) an extrusion molded product or a co-extrusion molded product of the polyolefin resin composition in accordance with the present invention and (ii) a substrate such as (a) films including, for example, polypropylene films, polyester films and polyamide films, which films are oriented or not; (b) aluminum foil; (c) cellophane; and (d) paper to a dry-lamination process or a sandwich-lamination process. A lamination film can be obtained, for example, by extruding the polyolefin resin composition in accordance with the present invention on the substrate, according to an extrusion coating process or a co-extrusion coating process.

The film in accordance with the present invention may be an oriented film or a non-oriented film. The latter is preferred.

The film in accordance with the present invention are most suitably used, for example, as a film for wrapping articles such as foods, fibers, medicines, fertilizers, miscellaneous goods and industrial parts; a film used for bags such as garbage bags and standardized bags; and a covering material such as coverings for agricultural purpose and coverings for building purpose.

EXAMPLE

The present invention is explained with reference to Examples, but the present invention is not limited thereto.

The components used are as follows.
1. Polyolefin Resin
(1) PO-1

Ethylene-butene-1 copolymer produced using a Ziegler type catalyst according to a gas phase ionic polymerization process, a trade mark of SUMIKATHENE L FS150, manufactured by Sumitomo Chemical Co., Ltd. With respect to the copolymer, a melt flow rate measured according to JIS K 6760, a density measured according to JIS K 6760, and a cold xylene-soluble portion (CXS) measured according to a process prescribed in § 175.1520 of Code of federal regulations, Food and Drugs Administration were 1.0 g/10 min., 921 kg/m$^3$ and 4.2% by weight, respectively.
(2) PO-2

Polyethylene produced according to a radical polymerization process, a trade mark of SUMIKATHENE F200-0, manufactured by Sumitomo Chemical Co., Ltd. A melt flow rate and density thereof measured according to the same as those in the above were 2.0 g/10 min. and 923 kg/M$^3$, respectively.
2. Anti-blocking Agent Characteristics of the following anti-blocking agents (1) to (4) are as summarized in Table 1.
(1) ABA-1

Calcined kaolinite powder, manufactured by Mizusawa Industrial Chemicals, Co., Ltd., having a volume average particle diameter of 2.55 μm, a content of particles having a particle diameter of 1.5 times the volume average particle diameter of 35.3% by weight, a content of particles having a particle diameter exceeding 22 μm of 0.38% by weight and a coefficient (S) of circular degree of 0.588.
(2) ABA-2

Calcined kaolinite powder, a trade mark of INSULITE MC-6, manufactured by Mizusawa Industrial Chemicals, Co., Ltd., having a volume average particle diameter of 3.17 μm, a content of particles having a particle diameter of 1.5 times the volume average particle diameter of 36.5% by weight, a content of particles having a particle diameter exceeding 22 μm of 11.8% by weight and a coefficient (S) of circular degree of 0.588.

(3) ABA-3

Aluminum silicate powder, a trade mark of SILTON JC-30, manufactured by Mizusawa Industrial Chemicals, Co., Ltd., having a volume average particle diameter of 3.11 μm, a content of particles having a particle diameter of 1.5 times the volume average particle diameter of 25.1% by weight, a content of particles having a particle diameter exceeding 22 μm of 0% by weight and a coefficient (S) of circular degree of 0.747.
(4) ABA-4

Aluminum silicate powder, a trade mark of SILTON JC-50, manufactured by Mizusawa Industrial Chemicals, Co., Ltd., having a volume average particle diameter of 6.49 μm, a content of particles having a particle diameter of 1.5 times the volume average particle diameter of 16.2% by weight, a content of particles having a particle diameter exceeding 22 μm of 0.52% by weight and a coefficient (S) of circular degree of 0.725.
3. Organic Amide Compound Mixture of erucic acid amide 80 parts by weight and ethylene-bis-stearic acid amide 20 parts by weight.

The following methods were applied for measuring physical properties.
1. Particle Diameter of Anti-blocking Agent A volume average particle diameter (μm) of the anti-blocking agent, a content (b1) (% by weight) of particles having a particle diameter of 1.5 times the volume average particle diameter, and a content (b2) (% by weight) of particles having a particle diameter exceeding 22 μm were measured according a process comprising the following steps (1) to (4):

(1) a sample is put in methanol, and thereafter is dispersed by means of ultrasonic waves, thereby obtaining a solution, (2) using a measurement apparatus, a trade mark of MICROTRAC FRA, manufactured by Nikkiso Co., Ltd., the solution was measured under conditions of a measurement range of from 0.12 to 704 μm and a particle diameter distribution of 50 areas, thereby obtaining a volume particle diameter distribution curve, (3) a cumulative 50% diameter in the volume particle diameter distribution curve is regarded as a volume particle diameter, and (4) a content (b1) (% by weight) of particles having a particle diameter of 1.5 times the volume average particle diameter, and a content (b2) (% by weight) of particles having a particle diameter exceeding 22μm are found from the volume particle diameter distribution curve.

2. Haze (%)

It was measured according to ASTM D1003-61.
3. LSI (%) (Light Scattering Intensity)

The film was allowed to stand for 24 hours or more under atmosphere of 23±2° C. and 50±5% RH (relative humidity). Thereafter, with respect to the film, scattering lights transmitted within scattering angles of from +0.4 to +1.20° and from −0.4 to −1.20° were measured using an LSI tester manufactured by Toyo Seiki Co., Ltd., thereby finding an LSI value of the film. The smaller the LSI value, the better the sense of through view.
4. Friction Angle (tan θ)

It was measured according to a process comprising the following steps (1) to (5):

(1) a test film of 160 mm length×80 mm width is attached on a sloping plate of a friction angle measuring instrument manufactured by Toyo Seiki Co., Ltd. with the aid of a double-sided adhesive tape, (2) on the other hand, a test film of 100 mm length×65 mm width (the same kind as that of the test film in the step (1)) is attached on a flat plate like weight having a size of 100 mm length×65 mm width and a weight of 1 kg with the aid of a double-sided adhesive tape, thereby obtaining an integrated product, (3) the integrated product obtained in the step (2) is put on the test film prepared in the step (1) so as to touch the film surface of the integrated product with the surface of the film in the step (1).

(4) the sloping plate is inclined at an inclination-increasing rate of 2.70°/sec, and (5) an angle θ at which the integrated product starts to slide is measured to know a tan θ. The smaller the tan θ, the better the sliding property.

5. Anti-blocking Property (N/m²)

It was measured according to a process comprising the following steps (1) to (3):

(1) in an oven kept at 40° C., two sheets of the film are piled one on another, and a weight of 400 g/cm²-film is put thereon, (2) the film piled is allowed to stand for 7 days in the oven and then taken out, and (3) with respect to the film taken out (two sheets of the film are bonded with each other), using a tension tester of a constant crosshead speed, a part of 500 cm² area thereof is subjected to separation in a shearing manner under a condition of a drawing speed of 200 mm/min., thereby finding a maximum stress required for the separation. The smaller a value of the maximum stress, the better the anti-blocking property.

6. Anti-scratching Property (ΔH) (%)

It was measured according to a process comprising the following steps (1) to (8):

(1) two sheets of a blown film are allowed to stand for 24 hours or more under atmosphere of 23±2° C. and 50±5% RH, (2) said two sheets are piled so as to face respective outer surfaces, (3) one side surface of the films piled is attached on a plate like sponge with a double-sided adhesive tape so as to form neither slack nor wrinkle, (4) the resulting set is fixed on a shaker, a trade mark of RECORPO SHAKER R-10 manufactured by TAITEC Co., (5) the other side surface of the films piled is fixed through a metal pipe whose surface is covered with a silicone rubber, (6) the films are rubbed with each other for 1 minute under conditions of an amplitude of 40 mm and a shaking rate of 60 times/min., (7) a Haze value of the film after rubbing is measured according to ASTM D1003-61, and (8) a ΔH (%) is calculated by the following formula (3), $$\Delta H = \text{Haze value of the film after rubbing} - \text{Haze value of the film before rubbing} \quad (3).$$

7. Fabrication (Stain on Roll)

It was measured according to a process comprising the following steps (1) to (4):

(1) the resin composition is molded according to an air cooling tubular film molding process, thereby obtaining a film, and the film of 400 m in length is wound on a paper pipe, (2) the film wound is allowed to stand for 3 days in an oven of 40° C., (3) said film is rewound under conditions of a line speed of 20 m/min. and a rewind-braking force of 15 kg·m using NSTC Type100 slitter manufactured by Nishimura MFG. Co., Ltd., and (4) a stain on a guide roll of the slitter is evaluated based on the following criteria, ⊚: no stain is observed, ○: a slight stain is observed, Δ: a stain is observed, and ×: a stain is observed and the stain is sometimes transferred to the film.

8. Coefficient (S) of Circular Degree

It was measured according to a process comprising the following steps (1) to (4):

(1) a sample is photographed by an optical microscope to obtain a picture (×800 magnification) having figures of 20 particles or more.

(2) the figure in the picture is treated with an image analyzer, a trade mark of IMAGE ANALYZER V10, manufactured by TOYOBO CO., LTD., thereby obtaining an image, (3) an area of a subject in the image and a perimeter of the subject are measured to obtain an average value of the area (A) and that of the perimeter (L), and (4) the obtained A and L values are substituted for the above-mentioned formula (1), thereby finding the coefficient (S) of circular degree.

9. Coefficient of Kinetic Friction

It was measured according to JIS K7125-1987. The smaller the value, the better the sliding property.

10. Appearance

More than one panelist observed flickering of the film, namely, amounts of grain having a length of about 50 to 100 μm), and it was judged on the basis of the following criteria, ⊚: all of the panelists judge that flickering of the film is slight, ○: almost all of the panelists judge that flickering of the film is slight, Δ: not less than half the number of the panelists judge that flickering of the film is slight, and ×: all of the panelists judge that flickering of the film is not slight.

11. Total Valuation

From the results of transparency, see through property anti-blocking property, sliding property, anti-scratching property, fabrication and flickering of films, balance between the appearance of the film and the practical physical properties thereof was totally valued on the basis of the following criteria, ○: balance between the appearance and the practical physical properties is satisfactory, Δ: balance between the appearance and the practical physical properties is slightly inferior, and ×: balance between the appearance and the practical physical properties is too inferior to put it into practical use.

Example 1 and Comparative Examples 1 to 4

An anti-blocking agent and a polyolefin resin were melt-kneaded using a Banbury mixer to obtain a master batch having an anti-blocking agent concentration of 10% by weight, provided that the weight of the master batch was assigned to be 100% by weight.

An organic amide compound and a polyolefin resin were melt-kneaded using a Banbury mixer to obtain a master batch having an organic amide compound concentration of 2.0% by weight, provided that the weight of the master batch was assigned to be 100% by weight.

The above-mentioned master batch of the anti-blocking agent, that of the organic amide compound and a polyolefin resin were dry-blended using a tumble mixer so as to have the proportions of respective components as shown in Table 2, thereby obtaining a mixture. The mixture was molded into a film using a tubular film molding machine having a 50 mmØ single screw extruder manufactured by Placo Co., Ltd. under conditions of an extrusion rate of 25 kg/hr, a die temperature of 200° C. and BUR (blow up ratio) of 1.8, thereby obtaining a single layer film having a thickness of 20 μm and another single layer film having a thickness of 80 μm in each Example and Comparative Example, provided that the polyolefin resin only was used in Comparative Example 1.

Evaluation results of the respective films are as shown in Table 3. For the measurement of Haze, LSI and flickering of films, the film of 80 μm thickness was used, and for the measurement of anti-blocking property, friction angle and anti-scratching property, the film of 20 μm thickness was used.

The results of Example 1 and Comparative Examples 2 to 4, in which one kind of the anti-blocking agent was used, and the results of Comparative Example 1, in which no anti-blocking agent was used, show the followings:

1. the film obtained in Example 1 using the anti-blocking agent, which satisfies the requirements defined in the present invention, was superior in transparency, see through property, anti-blocking property, sliding property, anti-scratching property and fabrication, hardly had visually dazzling sense (namely, superior in appearance), and was well-balanced in these properties,
2. the film obtained in Comparative Example 1 using no anti-blocking agent, which satisfies the requirements defined in the present invention, was insufficient in anti-blocking property, sliding property and fabrication,
3. the film obtained in Comparative Example 2 using the anti-blocking agent, ABA-2, which does not satisfy the requirements defined in the present invention, was insufficient in transparency and appearance,
4. the film obtained in Comparative Example 3 using the anti-blocking agent, ABA-3, which does not satisfy the requirements defined in the present invention, was insufficient in fabrication, and
5. the film obtained in Comparative Example 4 using the anti-blocking agent, ABA-4, which does not satisfy the requirements defined in the present invention, was insufficient in anti-scratching property and fabrication.

Example 2 and Comparative Examples 5 to 7

The above-mentioned master batch of the anti-blocking agent, that of the organic amide compound and a polyolefin resin were dry-blended using a tumble mixer so as to have the proportions of respective components as shown in Table 4, thereby obtaining a mixture. The mixture was molded into a film using a tubular film molding machine having a 50 mmØ single screw extruder manufactured by Placo Co., Ltd. under conditions of an extrusion rate of 25 kg/hr, a die temperature of 200° C. and BUR of 1.8, thereby obtaining a single layer film having a thickness of 20 μm and another single layer film having a thickness of 80 μm in each Example and Comparative Example.

Evaluation results of the respective films were as shown in Table 5. For the measurement of Haze, LSI and flickering of films, the film of 80 μm thickness was used, and for the measurement of anti-blocking property, friction angle and anti-scratching property, the film of 20 μm thickness was used.

The results of Example 2 and Comparative Examples 6 and 7, in which two kinds of the anti-blocking agents were used in combination, and the results of Comparative Example 5, in which one kind of the anti-blocking agent was used, show the followings:

1. the film obtained in Example 2 using two kinds of the anti-blocking agents, which satisfy the requirements defined in the present invention, was superior in transparency, see through property, anti-blocking property, sliding property, anti-scratching property and fabrication, hardly had visually dazzling sense (namely, superior in appearance) and was well-balanced in these properties,
2. the film obtained in Comparative Example 5 using the anti-blocking agent, ABA-2 only, which does not satisfy the requirements defined in the present invention, was insufficient in fabrication,
3. the film obtained in Comparative Example 6 using two kinds of the anti-blocking agents, which do not satisfy the requirements defined in the present invention, was insufficient in transparency and appearance, and
4. the film obtained in Comparative Example 7 using two kinds of the anti-blocking agents, which do not satisfy the requirements defined in the present invention, was insufficient in anti-scratching property and fabrication.

TABLE 1

|  | ABA-1 | ABA-2 | ABA-3 | ABA-4 |
| --- | --- | --- | --- | --- |
| Volume average particle diameter (μm) | 2.55 | 3.17 | 3.11 | 6.49 |
| b1 (wt %) | 35.3 | 36.5 | 25.1 | 16.2 |
| b2 (wt %) | 0.38 | 11.8 | 0 | 0.52 |
| S | 0.588 | 0.588 | 0.747 | 0.725 |

TABLE 2

|  | Example | Comparative Example | | | |
| --- | --- | --- | --- | --- | --- |
|  | 1 | 1 | 2 | 3 | 4 |
| Polyolefine resin | | | | | |
| PO-1 | 80 | 80 | 80 | 80 | 80 |
| PO-2 | 20 | 20 | 20 | 20 | 20 |
| Anti-blocking agent | | | | | |
| ABA-1 | 0.3 | — | — | — | — |
| ABA-2 | — | — | 0.3 | — | — |
| ABA-3 | — | — | — | 0.3 | — |
| ABA-4 | — | — | — | — | 0.3 |
| Organic amide compound | 0.19 | 0.19 | 0.19 | 0.19 | 0.19 |

TABLE 3

| | Example | Comparative Example | | | |
|---|---|---|---|---|---|
| | 1 | 1 | 2 | 3 | 4 |
| Haze (%) | 9.5 | 8.1 | 10.3 | 9.9 | 10.1 |
| LSI (%) | 6.7 | 1.8 | 9.7 | 7.6 | 11.2 |
| Anti-blocking (N/m$^2$) | 990 | 1310 | 910 | 860 | 840 |
| tan θ | 0.14 | 0.71 | 0.14 | 0.17 | 0.15 |
| ΔH (%) | 1.4 | — | 1.8 | 2.0 | 5.4 |
| Fabrication | ⊚ | X | ⊚ | X | Δ |
| Appearance | ○ | ⊚ | X | ○ | ○ |
| Total valuation | ○ | X | Δ | X | Δ |

TABLE 4

| | Example | Comparative Example | | |
|---|---|---|---|---|
| | 2 | 5 | 6 | 7 |
| Polyolefine resin | | | | |
| PO-1 | 80 | 80 | 80 | 80 |
| PO-2 | 20 | 20 | 20 | 20 |
| Anti-blocking agent | | | | |
| ABA-1 | 0.1 | — | — | — |
| ABA-2 | — | 0.1 | 0.1 | — |
| ABA-3 | 0.2 | — | 0.2 | 0.2 |
| ABA-4 | — | — | — | 0.1 |
| Organic amide compound | 0.19 | 0.19 | 0.19 | 0.19 |

TABLE 5

| | Example | Comparative Example | | |
|---|---|---|---|---|
| | 2 | 5 | 6 | 7 |
| Haze (%) | 3.7 | 3.7 | 4.0 | 3.7 |
| LSI (%) | 7.8 | 8.3 | 7.6 | 9.7 |
| Anti-blocking (N/m$^2$) | 780 | 860 | 850 | 830 |
| Coefficient of kinetic friction (μm) | 0.107 | 0.116 | 0.107 | 0.109 |
| ΔH (%) | 1.8 | 2.0 | 1.8 | 3.1 |
| Fabrication | ⊚ | X | ⊚ | Δ |
| Appearance | ○ | ⊚ | X | ○ |
| Total valuation | ○ | X | Δ | Δ |

What is claimed is:

1. A polyolefin resin composition comprising:

(i) a polyolefin resin, and
   (ii) an anti-blocking agent in an amount of from 500 to 15,000 ppm by weight based on the weight of the polyolefin resin, which anti-blocking agent is made of a natural mineral and has:

(a) a volume average particle diameter of from 1 to 5 μm,
   (b) particles having a particle diameter of not less than 1.5 times the above-defined volume average particle diameter in an amount of from 30 to 40% by weight, and
   (c) particles having a particle diameter exceeding 22 μm in an amount of less than 1.0% by weight, provided that the above-defined % by weight is based on that the total weight of the anti-blocking agent made of a natural mineral is regarded as 100% by weight.

2. The polyolefin resin composition according to claim 1, wherein the composition further comprises (iii) an organic amide compound in an amount of from 200 to 5,000 ppm by weight based on the weight of the polyolefin resin.

3. The polyolefin resin composition according to claim 1, wherein the anti-blocking agent made of a natural mineral comprises kaolinite.

4. The polyolefin resin composition according to claim 2, wherein the anti-blocking agent made of a natural mineral comprises kaolinite.

5. The polyolefin resin composition according to claim 1, wherein the composition further comprises (iv) a synthetic anti-blocking agent, wherein:

(a) the synthetic anti-blocking agent has a volume particle diameter of from 1 to 10 μm,
   (b) a weight ratio of a content of the synthetic anti-blocking agent to a content of the anti-blocking agent made of a natural mineral is from 10/90 to 90/10, and
   (c) a total content of the synthetic anti-blocking agent and the anti-blocking agent made of a natural mineral is from 500 to 15,000 ppm by weight based on the weight of the polyolefin resin.

6. The polyolefin resin composition according to claim 5, wherein the composition further comprises (iii) an organic amide compound in an amount of from 200 to 5,000 ppm by weight based on the weight of the polyolefin resin.

7. The polyolefin resin composition according to claim 5, wherein the anti-blocking agent made of a natural mineral comprises kaolinite.

8. The polyolefin resin composition according to claim 5, wherein the synthetic anti-blocking agent comprises synthetic noncrystal aluminosilicate fine powder.

9. The polyolefin resin composition according to claim 6, wherein the anti-blocking agent made of a natural mineral comprises kaolinite.

10. The polyolefin resin composition according to claim 6, wherein the synthetic anti-blocking agent comprises synthetic noncrystal aluminosilicate fine powder.

11. A film comprising the polyolefin resin composition according to claim 1.

12. A film comprising the polyolefin resin composition according to claim 2.

13. A film comprising the polyolefin resin composition according to claim 5.

14. A film comprising the polyolefin resin composition according to claim 6.

* * * * *